(12) United States Patent
Yun

(10) Patent No.: US 6,700,624 B2
(45) Date of Patent: Mar. 2, 2004

(54) COMBINED TERRESTRIAL WAVE/CABLE BROADCAST RECEIVER AND PROGRAM INFORMATION PROCESSING METHOD THEREFOR

(75) Inventor: Hwa Young Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 517 days.

(21) Appl. No.: 09/750,341

(22) Filed: Dec. 29, 2000

(65) Prior Publication Data

US 2001/0006404 A1 Jul. 5, 2001

(30) Foreign Application Priority Data

Dec. 30, 1999 (KR) .......................................... 1999-66258
Jan. 12, 2000 (KR) ........................................... 2000-1413

(51) Int. Cl.$^7$ ............................................... H04N 5/46
(52) U.S. Cl. ........................ 348/555; 348/554; 348/553; 348/563; 725/40
(58) Field of Search ................................. 348/553, 554, 348/555, 556, 558, 570, 563, 569, 731, 732, 906; 725/39, 40, 131, 139, 151; H04N 5/46

(56) References Cited

U.S. PATENT DOCUMENTS

| 5,592,235 | A | * | 1/1997 | Park et al. ................... 348/555 |
| 5,982,411 | A | * | 11/1999 | Eyer et al. ..................... 725/49 |
| 6,075,569 | A | * | 6/2000 | Lee et al. .................... 348/554 |
| 6,133,910 | A | * | 10/2000 | Stinebruner ................... 725/49 |
| 6,137,539 | A | * | 10/2000 | Lownes et al. ............. 348/569 |
| 6,486,925 | B1 | * | 11/2002 | Ko ............................... 348/731 |
| 6,525,775 | B1 | * | 2/2003 | Kahn et al. ................. 348/460 |

* cited by examiner

Primary Examiner—Michael H. Lee
Assistant Examiner—Trang U. Tran
(74) Attorney, Agent, or Firm—Birch, Stewart, Kolasch & Birch, LLP

(57) ABSTRACT

A combined terrestrial wave/cable broadcast receiver is disclosed which identifies if a cable broadcast program being carried and received or a cable broadcast program to be received is a HD broadcast and receives a HD broadcast from a terrestrial wave broadcasting station in the form of a HD terrestrial wave broadcast automatically or according to a user's selection, and a program information processing method therefor which processes program information such that it can identify a cable broadcast program as a HD broadcast in an EIT. In a program information processing method for a combined terrestrial wave/cable broadcast receiver for receiving a broadcast signal and indicating the characteristics of the broadcast signal, the program information processing method for the combined terrestrial wave/cable broadcast receiver according to the present invention includes the steps of: analyzing an A/V stream for storing the same; reading a data to be displayed on a predetermined display according to a user's selection; judging if the read data contains a HD descriptor and other descriptors; and displaying a broadcast program by adding an indicator for indicating that a cable broadcast program is a HD program, if there exists a HD descriptor.

11 Claims, 13 Drawing Sheets

FIG. 3
CONVENTIONAL ART

| SYNTAX | BITS | FORMAT |
|---|---|---|
| event_information_table_section(){ | | |
|     table_id | 8 | 0xcd |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     zero | 2 | '00' |
|     version_number | 5 | uimsbf |
|     current_next_indicator | 1 | '1' |
|     section_number | 8 | uimsbf |
|     protocol_version | 8 | uimsbf |
|     num_events_in_section | 8 | uimsbf |
|     for(j=0; j<num_events_in_section; j++){ | 8 | uimsbf |
|         reserved | | |
|         event_id | 2 | '11' |
|         startved | 14 | uimsbf |
|         ETM_location | 32 | uimsbf |
|         length_in_seconds | 2 | '11' |
|         title_length | 2 | bslbf |
|         title_text() | 20 | uimsbf |
|         reserved | 8 | uimsbf |
|         descriptors_length | var | |
|         for(i=0; i<N; i++) | 4 | '1111' |
|             descriptor() | 12 | |
|         } | | |
|     } | | |
|     CRC_32 | 32 | rpchof |
| } | | |

FIG. 4
CONVENTIONAL ART

| DESCRIPTOR NAME | DESCRIPTOR TAG | TERRESTRIAL | | | | CABLE | | |
|---|---|---|---|---|---|---|---|---|
| | | PMT | MGT | VCT | EIT | PMT | MGT | VCT |
| STUFFING DESCRIPTOR | 0x80 | * | * | * | * | * | * | * |
| AC-3 AUDIO DESCRIPTOR | 0x81 | * | | | * | * | | |
| PROGRAM IDENTIFIER DESCRIPTOR | 0x85 | * | | | | * | | |
| CAPTION SERVICE DESCRIPTOR | 0x86 | * | | | * | * | | |
| CONTENT ADVISORY DESCRIPTOR | 0x87 | * | | | * | * | | |
| EXTENDED CHANNEL NAME DESCRIPTOR | 0xA0 | | | * | | | | * |
| SERVICE LOCATION DESCRIPTOR | 0xA1 | | | * | | | | |
| TIME-SHIFTED SERVICE DESCRIPTOR | 0xA2 | | | * | | | | * |
| COMPONENT NAME DESCRIPTOR | 0xA3 | | | | | * | | |
| USER PRIVATE | 0xC0-0xFF | | * | * | * | | * | * |

FIG. 5

| SYNTAX | BITS | FORMAT |
|---|---|---|
| event_information_table_section(){ | | |
|     table_id | 8 | 0xcd |
|     section_syntxt_indicator | 1 | '1' |
|     provate_indicator | 1 | '1' |
|     reserved | 2 | '11' |
|     section_length | 12 | uimsbf |
|     source_id | 16 | uimsbf |
|     zero | 2 | '00' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for(j=0; j<num_events_in_section; j++){ | | |
|         reserved | 2 | '11' |
|         event_id | 14 | uimsbf |
|         start_time | 32 | uimsbf |
|         reserved | 2 | '11' |
|         ETM_location | 2 | bslbf |
|         length_in_seconds | 20 | uimsbf |
|         title_length | 8 | uimsbf |
|         title_text() | var | |
|         reserved | 4 | '1111' |
|         descriptors_length | 12 | |
|         for(i=0; i<N; i++) | | |
|             descriptor() | | |
|         } | | |
|     } | | |
|     CRC_32 | 32 | rpchof |
| } | | |
| | | |
| HD_stream_descriptor(){ | | |
|     descriptor_tag | 8 | |
|     descriptor_length | 8 | |
|     Horizontal_resolution | 12 | |
|     Vertical_resolution | 12 | |
|     Aspect_ratio | 3 | |
|     Frame_rate | 4 | |
|     Progressive_sequence | 1 | |
| } | | |

FIG. 6

| DESCRIPTOR NAME | DESCRIPTOR TAG | TERRESTRIAL | | | | CABLE | | | |
|---|---|---|---|---|---|---|---|---|---|
| | | PMT | MGT | VCT | EIT | PMT | MGT | VCT | EIT |
| STUFFING DESCRIPTOR | 0x80 | * | * | * | * | * | * | * | * |
| AC-3 AUDIO DESCRIPTOR | 0x81 | * | | | * | * | | | * |
| PROGRAM IDENTIFIER DESCRIPTOR | 0x85 | * | | | | * | | | |
| CAPTION SERVICE DESCRIPTOR | 0x86 | * | | | * | * | | | * |
| CONTENT ADVISORY DESCRIPTOR | 0x87 | * | | | * | * | | | * |
| EXTENDED CHANNEL NAME DESCRIPTOR | 0xA0 | | | * | | | | * | |
| SERVICE LOCATION DESCRIPTOR | 0xA1 | | | * | | | | | |
| TIME-SHIFTED SERVICE DESCRIPTOR | 0xA2 | | | * | | | | * | |
| COMPONENT NAME DESCRIPTOR | 0xA3 | | | | | * | | | |
| USER PRIVATE | 0xC0-0xFF | | * | * | * | | * | * | * |
| HD DESCRIPTOR | 0x80 | * | | | * | * | | | * |

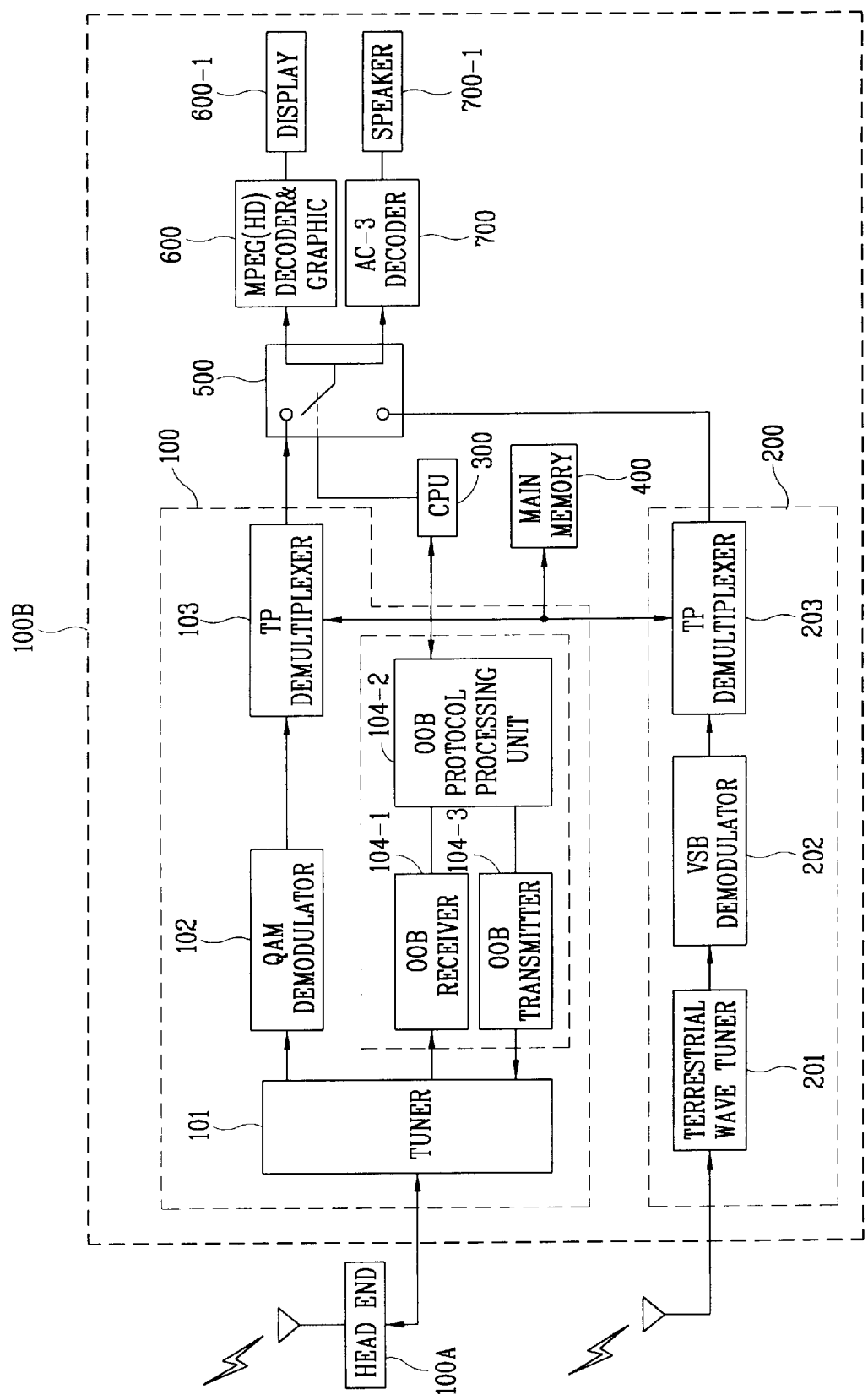

COMBINED TERRESTRIAL WAVE/CABLE BROADCAST RECEIVER AND PROGRAM INFORMATION PROCESSING METHOD THEREFOR

BACKGROUND OF THE INVENTION

1. Field of the Invention

The present invention relates to a digital broadcast receiver and method for displaying a program format, and more particularly, to a combined terrestrial wave/cable broadcast receiver which identifies if a cable broadcast program being carried and received or a cable broadcast program to be received is a HD broadcast and receives a HD broadcast from a terrestrial wave broadcasting station in the form of a HD terrestrial wave broadcast automatically or according to a user's selection, and a program information processing method therefor which processes program information such that it can identify a cable broadcast program as a HD broadcast in an EIT.

2. Description of the Background Art

Presently, in the U.S., televisions installed at most homes receives cable broadcasts and terrestrial wave broadcasts and shows them to viewers in connection to a cable head end via cables. That is, cable system operators transmit analog terrestrial waves to those televisions through some cable channels according to the FCC(Federal Communication Commission) commands(or "must carry" rules), although televisions installed at areas providing cable broadcasts can receive analog terrestrial waves. Thus, the viewers view terrestrial wave broadcasts as well as cable broadcasts transmitted from the cable head end.

However, as terrestrial wave digital broadcasts start in the U.S., there continues a discussion that the ground digital broadcasts must be transmitted from a cable head end to televisions via cables in the same manner as analog terrestrial wave broadcasts, and, for this purpose, the ground digital broadcasts must be carried. According to this, the terrestrial wave digital broadcasts will be carried from the cable head end to be transmitted to televisions of subscribers via cables in the future.

Even though a number of American terrestrial wave broadcasters currently increase the number of HD level broadcasts in order to be competitive with other rival media, cable operators require a lot of cable channel resources in order to carry and transmit HD level broadcasts via cables. Thus, it is very likely that the HD terrestrial wave broadcasts are carried after being down-converted to SD level broadcasts.

Meanwhile, even though a HD level cable set top box or digital TV(DVT) currently being distributed can receive HD level broadcasts, the broadcasts carried and transmitted by the cable head end are nothing but SD level broadcasts because of the problems of the cable operators. Accordingly, it is very likely that the HD level cable set top box or digital TV receives SD level broadcasts. In this case, the HD cable set top box or digital TV cannot receive HD terrestrial wave broadcasts.

FIG. 1 is a block diagram illustrating a cable set top box according to the conventional art. The cable set top box 10B is connected to a head end 10A transmitting a terrestrial wave broadcast or its own predetermined broadcast.

The cable set top box 10B includes: a cable tuner 11 for tuning to a specific channel upon receipt of a broadcast transmitted from the head end 10A; a QAM demodulator 12 for demodulating a tuned signal from the cable tuner 11 by QAM modulation; an OOB processing unit 13 for performing a two-way communication with the head end 10A upon receipt of information about channel tuning, program guide, etc. via an OOB(Out of Band); a CPU 14 for outputting a predetermined control signal upon receipt of a processed signal from the OOB processing unit 13; a transport(TP) demultiplexer 15 for demultiplexing the demodulated signal into a demodulated video signal and a demodulated audio signal according to the control signal outputted from the CPU 14; and a MPEG decoder 16 and AC-3 decoder 17 for decoding the demodulated video signal and the demodulated audio signal outputted from the TP demultiplexer 15 to output a video signal and an audio signal, respectively.

Here, the OOB processing unit 13 includes: an OOB receiver 13-1 for receiving information about a channel-tuned signal, program guide, etc. from the tuner 11; an OOB protocol processing unit 13-2 for processing the protocol of the signal outputted from the OOB receiver 13-1 to thus output the processed signal into the CPU 14; and an OOB transmitter 13-3 for outputting the signal from the OOB protocol processing unit 13-2 to the tuner 11 according to the control of the CPU 14.

The thusly constructed cable set top box 10B receives terrestrial wave broadcasts and its own cable broadcasts from the head end 10A, but does not directly receive terrestrial wave broadcasts from a terrestrial wave broadcasting station.

To solve the above problem, therefore, a combined terrestrial wave/cable broadcast receiver or DTV developed by set top or DTV manufacturers is being distributed. For example, the combined terrestrial wave/cable broadcast receiver or DTV receives and shows a broadcast that a viewer wants by selecting a program that the viewer wants to view, such as a HD level terrestrial wave broadcast program, or setting and selecting a channel by each program.

However, the combined terrestrial wave/cable broadcast receiver or DTV does not inform a viewer of whether or not a carried and received terrestrial wave broadcast is a HD level broadcast, and, as illustrated in FIG. 2, a program guide information also does not identify if a program to be broadcast is a HD level broadcast. Therefore, if the viewer wants to view a terrestrial wave broadcast carried and transmitted via cables, he or she must convert the state of receiving a cable broadcast into the state of receiving a terrestrial wave broadcast by controlling the combined broadcast receiver or DTV in order to identify if the broadcast is a HD level broadcast.

Meanwhile, since program guide information(EPG) on cable broadcasts transmitted from the head end does not contain a descriptor for identifying that a cable broadcast being transmitted or to be transmitted is a HD level broadcast, as illustrated in FIG. 2, the program guide information displayed on a screen does not contain information relating to HD level broadcast programs.

FIG. 3 is a view illustrating an EIT(Event Information Table) among the information on the standard EPG in the terrestrial wave/cable digital broadcast specification according to the conventional art, which contains a table ID, source ID, section, and other predetermined factors. In particular, the section contains an event ID(or broadcast program), descriptor for the broadcast program, and other predetermined factors.

The EIT can have a three-hour unit, program-related information, and can define maximum 128 programs, so it is possible to provide program-related information for maximum 16 days.

In addition, the EIT provides program-related information, not in unit of physical channels, but in unit of virtual channels that a viewer can actually view according to a source ID(source_id).

Accordingly, since the EIT provides program information, such as the number of actual broadcast programs, starting time of each program, program length, program title, etc. by each virtual channel, an EPG capable of guiding viewers to broadcast programs is formed by constructing a database of EITs for the entire broadcast channels, as illustrated in FIG. 2. In other words, the above EPG screen displays virtual channels and programs to be broadcast on time.

FIG. 4 is a table for defining descriptors according to the conventional art, which defines additional information to be added by each program.

The descriptor defining table defines descriptor types, descriptor tags, descriptors(PSIP table) transmitted through terrestrial waves, and descriptors (SI(service information) table) transmitted through cables.

Here, the PSIP table contains a PMT(Program Map Table), MGT, VCT, and EIT, and the SI table contains a PMT, VCT, EIT, etc.

Therefore, since the EIT or PMT forming the program guide information provided by the cable operator does not contain a descriptor for defining any information relating to HD level broadcasts, the viewers cannot easily select and view a high definition broadcast program.

SUMMARY OF THE INVENTION

Accordingly, it is an object of the present invention to provide a program information processing apparatus and method which processes information relating to HD programs to be contained in an EPG source for indicating if a cable broadcast program carried and transmitted by a cable head end or a cable broadcast program to be transmitted later is a HD broadcast on a screen of a set top box of a viewer.

It is another object of the present invention to provide a program information processing apparatus and method which processes information relating to HD broadcast programs to be contained in an EIT or PMT of an EPG source for indicating if a cable broadcast carried and transmitted by a cable head end or a cable broadcast program to be transmitted is a HD broadcast on a screen of a set top box of a viewer.

It is another object of the present invention to provide a program information processing apparatus and method which processes information relating to HD broadcast programs so that a HD descriptor is contained in an EIT or PMT for displaying if a cable broadcast carried and transmitted by a cable head end or a cable broadcast program to be transmitted is a HD broadcast on a screen of a set top box of a viewer.

It is another object of the present invention to provide a combined terrestrial wave/cable broadcast receiver which identifies if a cable broadcast carried and received or a cable broadcast program to be received is a HD broadcast and receives a HD broadcast from a terrestrial wave broadcasting station in the form of a HD terrestrial wave broadcast automatically or according to a user's selection.

To achieve the above objects, in a program information processing method for a combined terrestrial wave/cable broadcast receiver for receiving a broadcast signal and indicating the characteristics of the broadcast signal, there is provided a program information processing method for a combined terrestrial wave/cable broadcast receiver according to the present invention, which includes the steps of: analyzing an A/V stream for storing the same; reading a data to be displayed on a predetermined display according to a user's selection; judging if the read data contains a HD descriptor and other descriptors; and displaying a broadcast program by adding an indicator for indicating that a cable broadcast program is a HD program, if there exists a HD descriptor.

In addition, there is provided a program information processing apparatus according to the present invention, which includes: a cable broadcast receiving unit for receiving a cable broadcast signal transmitted from a cable head end via cables; a terrestrial wave broadcast receiving unit for receiving a terrestrial wave broadcast signal; an output unit for outputting the broadcast signals received by the cable broadcast receiving unit and terrestrial wave broadcast receiving unit to the outside so that a viewer can view a broadcast program; a control unit for judging if a cable broadcast signal being received or to be received by the cable broadcast receiving unit is a HD broadcast signal, and, if so, automatically indicating that it is a HD broadcast signal in the output unit; and a switching unit in which, if a HD broadcast signal, the terrestrial wave broadcast receiving unit directly receives a HD terrestrial wave broadcast signal to output the same to the output unit according to the control of the control unit receiving a command signal of a viewer.

In addition, in a receiver for showing a broadcast program to a viewer upon receipt of a broadcast signal, there is provided a program information processing apparatus according to the present invention, which includes: a demultiplexer for demultiplexing an A/V stream into a video signal and an audio signal and outputting a PSIP table or SI table; an EIT processing unit for processing information relating to broadcast programs being received or to be received by analyzing an EIT contained the PSIP table or SI table; a program guide information implementation unit for implementing screen contents to be displayed and HD broadcast-related information upon receipt of information relating to broadcast programs processed by the EIT processing unit or PMT processing unit; and a graphic processing unit for processing the screen contents to be displayed and HD broadcast-related information outputted from the program guide information implementation unit.

Additional advantages, objects and features of the invention will become more apparent from the description which follows.

BRIEF DESCRIPTION OF THE DRAWINGS

The present invention will become better understood with reference to the accompanying drawings which are given only by way of illustration and thus are not limitative of the present invention, wherein:

FIG. 3 is an EIT syntax according to the conventional art;

FIG. 4 is table for defining descriptors according to the conventional art;

FIG. 5 is an EIT syntax according to the present invention;

FIG. 6 is a table for defining descriptors according to the present invention;

FIG. 7 is a block diagram illustrating a combined terrestrial wave/cable broadcast receiver according to the present invention;

DETAILED DESCRIPTION OF THE PREFERRED EMBODIMENTS

Figure 1:
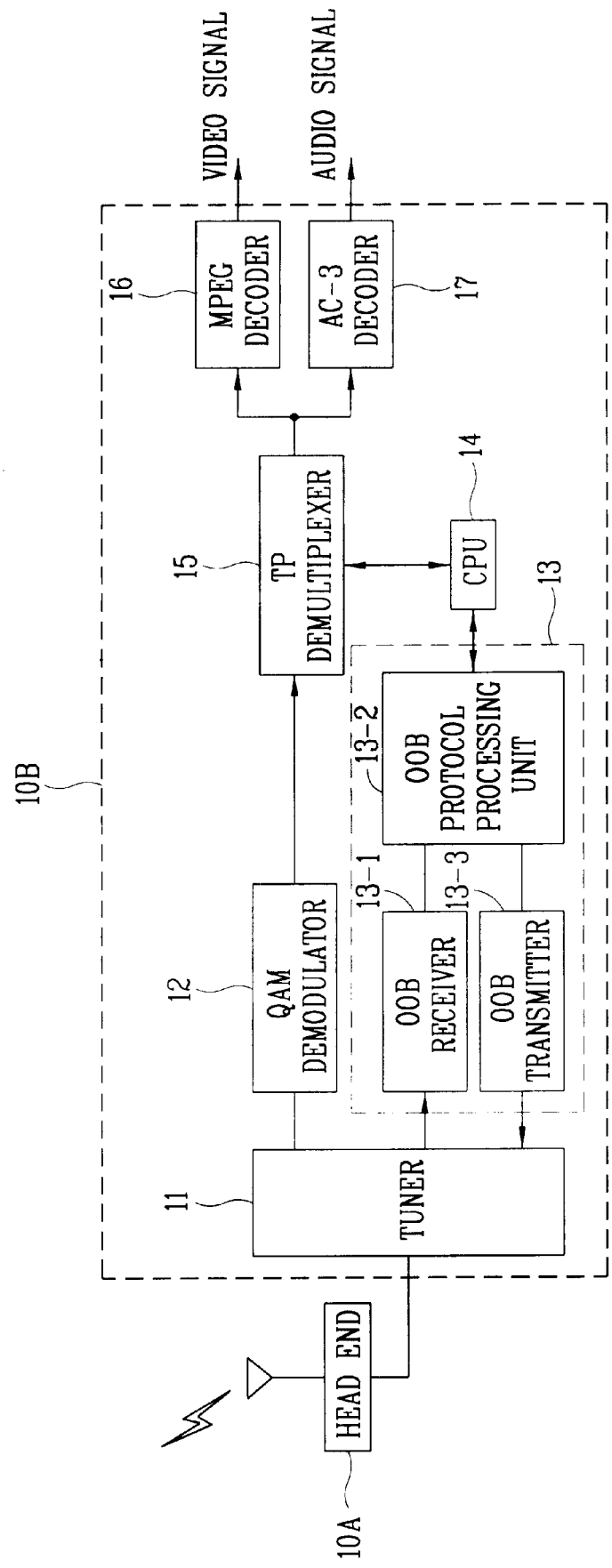
FIG. 1 is a block diagram illustrating a cable set top box according to the conventional art.
Figure 2:
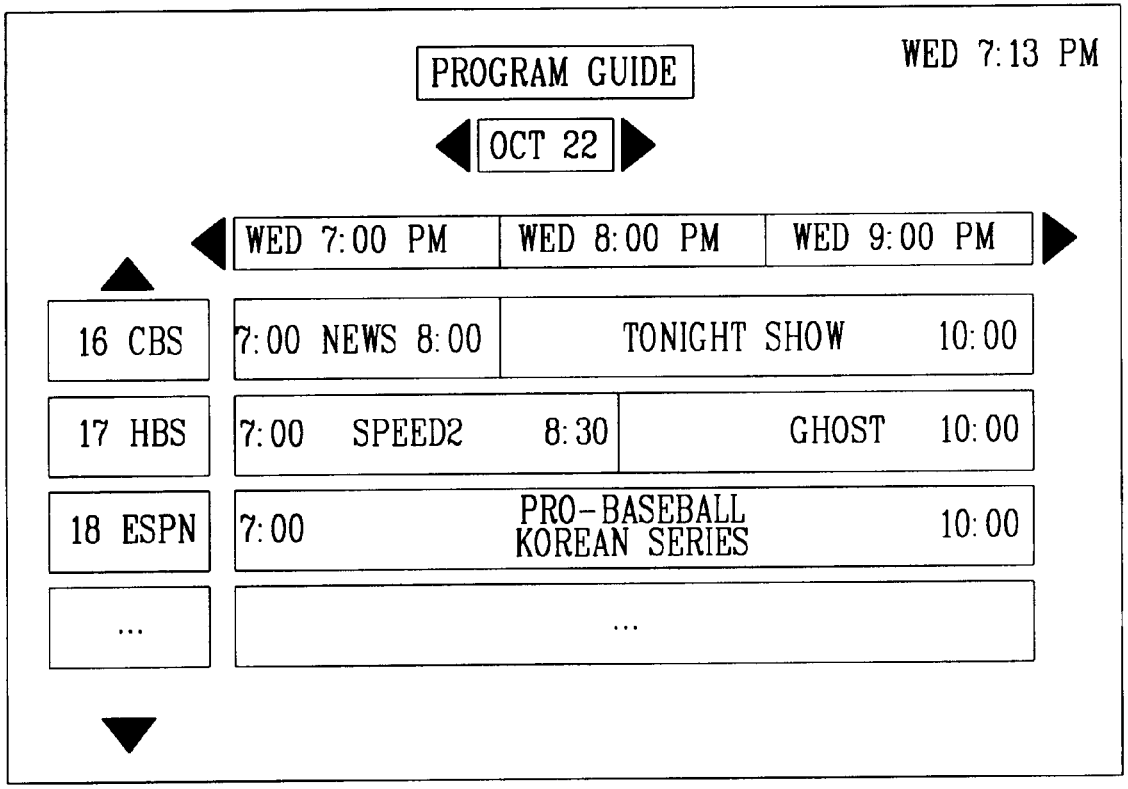
FIG. 2 is an EPG displayed on a screen according to the conventional art.

FIG. 5 is a view illustrating an EIT(Event Information Table) of the information relating to the standard EPG in the terrestrial wave/cable digital broadcast specification according to the present invention, which contains a table ID, source ID, section, and other predetermined factors, said section containing an event ID(or broadcast program), descriptor for the broadcast program, and other predetermined factor. In particular, the EIT contains a HD descriptor [HD_stream_descriptor( )], said HD descriptor containing a descriptor tag, descriptor length, resolution, aspect ratio, frame rate, and progressive sequence. In addition, the HD descriptor can be contained in the PMT.

A cable operator generates an EIT or PMT, defines a HD descriptor in addition to the table for defining descriptors as illustrated in FIG. 6, and then transmits the newly generated EPG to each subscriber's television via cables.

FIG. 7 is a block diagram illustrating a combined terrestrial wave/cable broadcast receiver according to the conventional art, in which a terrestrial wave/cable set top box 100B is connected to a head end 100a for receiving a terrestrial wave broadcast to transmit the same or transmitting its own predetermined broadcast.

The terrestrial wave/cable set top box 100B includes: a cable network interface unit 100 connected to the head end 100A by cables and receiving a terrestrial wave/cable broadcast; a terrestrial wave network interface unit 200 for receiving the terrestrial wave broadcast via a terrestrial wave antenna; a CPU 300 for outputting a predetermined control signal upon receipt of a signal from the cable network interface unit; a main memory 400 for storing the signal outputted from the cable network interface unit 100 and terrestrial wave network interface unit 200; a switching unit 500 for selecting and outputting a demodulated signal outputted from the cable network interface unit 100 and terrestrial wave network interface unit 200 according to the control signal from the CPU 300; a video decoder 600 and audio decoder 700 for decoding the demodulated signal from the switching unit 500 to output a video signal and an audio signal, respectively; a display 600-1 for displaying an image upon receipt of the video signal; and a speaker 700-1 for outputting sound upon receipt of the audio signal.

Here, the cable network interface unit 100 includes: a cable tuner 101 for tuning to a specific channel upon receipt of a signal from the head end 100A; a QAM demodulator 102 for demodulating a tuned signal from the cable tuner 101 to output an A/V stream; a transport demultiplexer 103 for separating the A/V stream into a demodulated video signal and a demodulated audio signal to thus output them; and an OOB processing unit 104 for performing a two-way communication with the head end 100A upon receipt of information such as channel tuning and program guide through an OOB.

The terrestrial wave network interface unit 200 includes: a terrestrial wave tuner 201 for tuning to a specific channel upon receipt of a signal received by the terrestrial wave antenna; a VSB demodulator 202 for demodulating a tuned signal from the terrestrial wave tuner 201 by VSB modulation to output an A/V stream; and a TP demultiplexer 203 for separating the A/V stream into a demodulated video signal and a demodulated audio signal to thus output them.

The OOB processing unit 104 includes: an OOB receiver 104-1 for receiving a channel-tuned signal and program guide information from the cable tuner 101; an OOB protocol processing unit 104-2 for processing the protocol of the signal outputted from the OOB receiver 104-1 to output the processed signal to the CPU 300; and an OOB transmitter 104-3 for outputting the signal outputted from the OOB protocol processing unit 104-2 to the cable tuner 101 according to the control of the CPU 300.

The video decoder 600 decodes video packets by a MPEG algorithm to output them to the display 600-1, and the audio decoder 700 decodes audio packets by an AC-3 algorithm to output them to the speaker 700-1.

Here, both of the cable network interface unit and the terrestrial wave network interface unit are installed at one set top. In addition, the TP demultiplexers 103 and 203 are connected to its respective network independently. Thus, it is possible for each TP demultiplexer to processing signals received from different sources in parallel.

At this time, the cable tuner 101 and the terrestrial wave tuner 201 utilize tables for defining parameters relating to tuning for the purpose of channel tuning of a received signal. In other words, with respect to terrestrial wave broadcasts, signals containing PISPs by each physical channel are transmitted, and with respect to cable broadcasts, signals containing Si tables are transmitted through the OOB.

Figure 8:
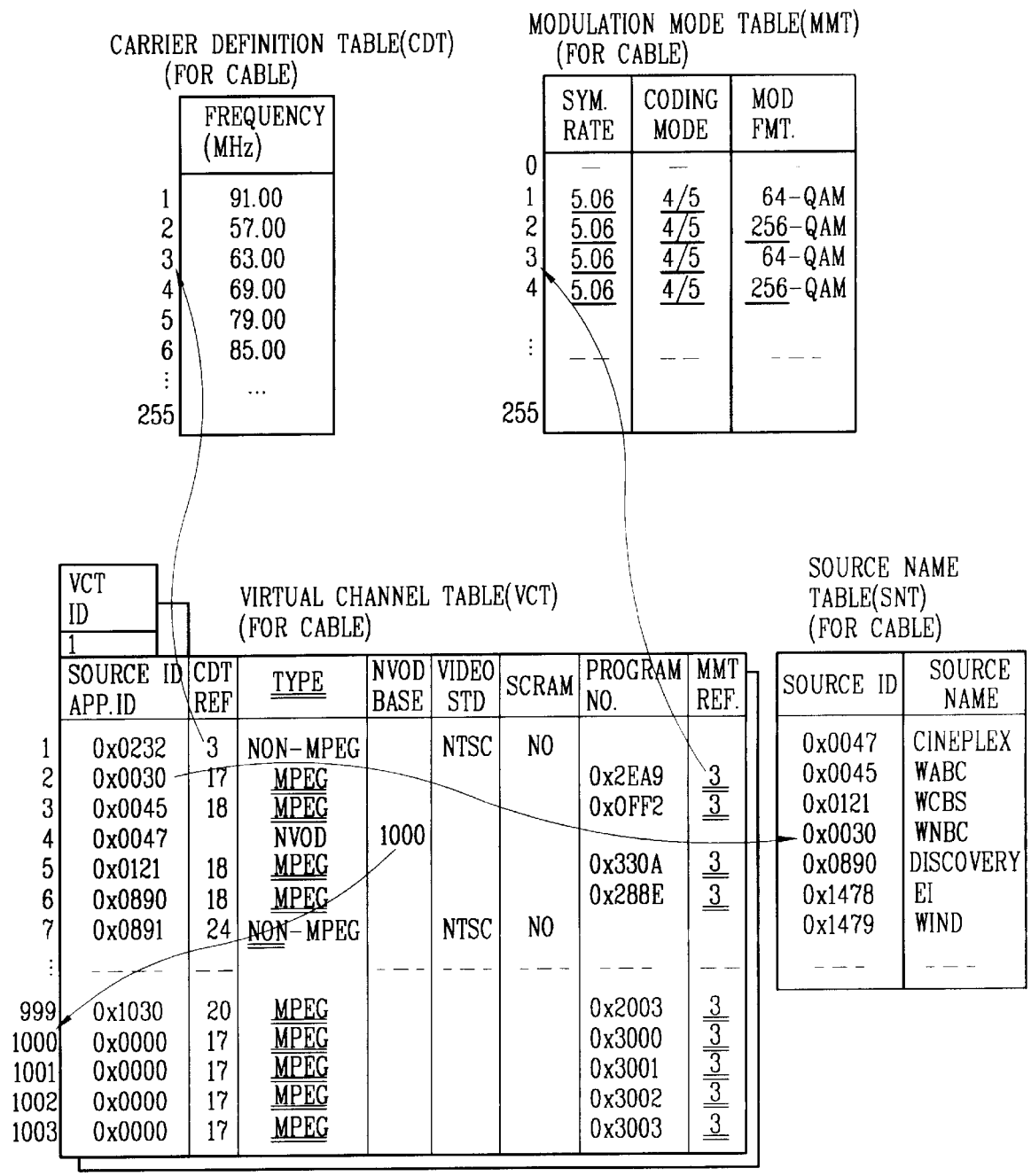
FIG. 8 is a SI table according to the present invention.

In addition, for the purpose of channel tuning, the cable broadcast is transmitted by including a VCT(virtual channel table), CDT(carrier definition table), MMT(modulation mode table), SNT(source name table), etc. among the SI tables, as illustrated in FIG. 8.

Therefore, when a cable broadcast viewer selects a channel by using a selection device such as a remote control, the CPU 300 recognizes the user-selected channel as a virtual channel number, not an actual physical channel. The CPU 300 obtains a source ID(source_id) and program number from the VCT by using the virtual channel number, and finds out a tuning frequency and modulation mode by using the correlation between the CDT and the MMT thereby tuning to a physical channel.

When the physical channel is tuned to, the CPU must find out audio and video PIDs of the virtual channel that the user wants. For this purpose, if the PMT defined in a MPEG system layer is analyzed, those PIDs can be found out. The PMT describes PID list of transport packets containing a program identification number and video and audio bit streams comprising a program.

At this time, since there may exist a number of virtual channels in a signal physical channel, the CPU 300 finds out audio and video PIDs by searching a PMT table consistent with the program number of the virtual channel that the user has selected. When the audio and video PIDs are obtained, the CPU 300 tunes a cable broadcast by the cable tuner of the cable interface unit 100, and sets the audio and video PIDs to the TP demultiplexer 103. Then, the TP demultiplxer 103 receives demodulated A/V packets from the QAM demodulator 102 to output them to the video decoder 600 and the audio decoder 700 through the switching unit 500, for thereby making the viewer view the program corresponding to the channel selected by himself or herself.

Here, the aforementioned selection device is a remote control, or a control device integrally attached to a predetermined position of the combined terrestrial wave/cable broadcast receiver, which further including a keyboard or mouse connected to the combined terrestrial wave/cable broadcast receiver by wires or wirelessly.

Meanwhile, when the cable operator carries a number of terrestrial wave digital broadcasts, down-converts the same to SD broadcasts, and then transmits them to subscribers, the SD broadcasts are multiplexed and transmitted in a number of virtual channels in a signal physical channel.

At this time, all those carried terrestrial wave broadcasts have their respective unique source ID(source_id) recorded on a cable VCT.

With respect to a terrestrial wave broadcast, the PSIP table containing only the contents of virtual channels in each physical channel is transmitted by each physical channel. Thus, if a power is supplied to the set top box, the CPU 300 makes a VCT for the entire terrestrial wave channels by analyzing the PSIP table while scanning all currently receivable terrestrial wave channels, or the combined terrestrial wave/cable broadcast receiver according to the present invention makes a VCT for the entire terrestrial wave channels while scanning the terrestrial wave channels at the time when the viewer have viewed a cable broadcast.

Figure 9:
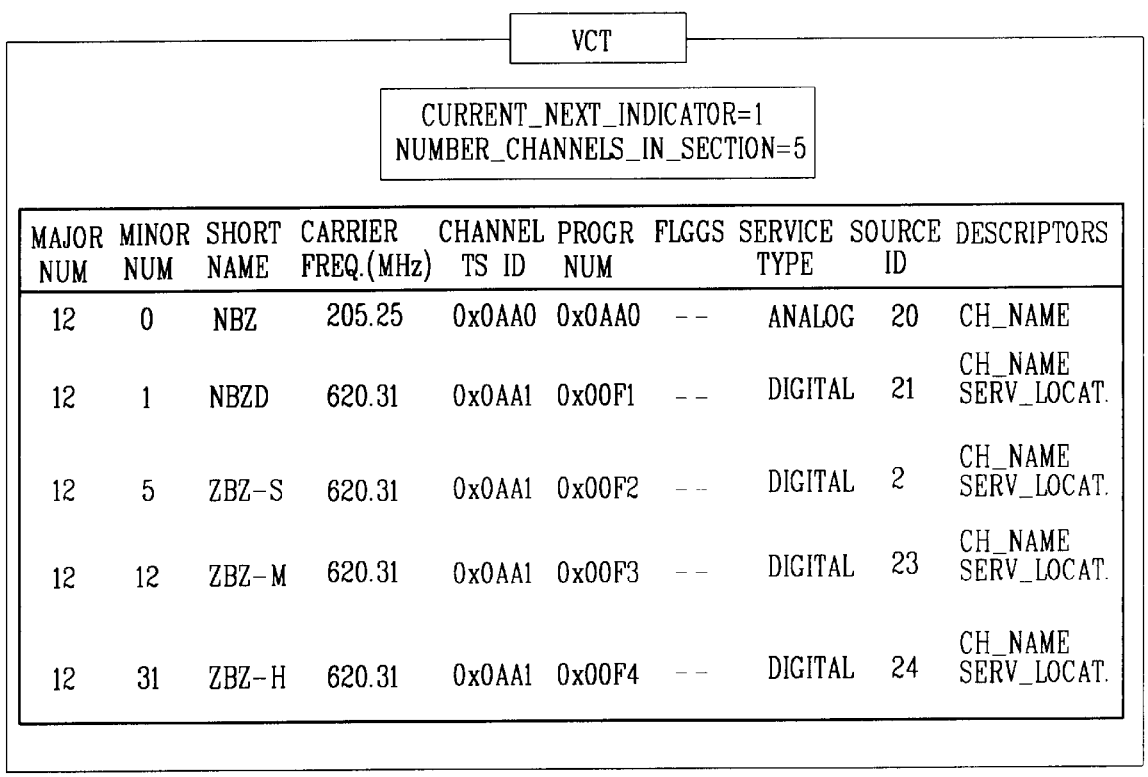
FIG. 9 is a terrestrial wave VCT according to the present invention.

FIG. 9 is a terrestrial wave VCT according to the present invention. The VCT for the entire terrestrial wave channels is configured by constructing a VCT database of VCTs for each physical channel.

As illustrated in the aforementioned VCT, if a source ID(source_id) is known, information for tuning to a desired virtual channel can be obtained, and if a service location descriptor(service_location descriptor) is analyzed, a PID for audio and video packets can obtained.

Accordingly, the viewer starts to select and view a SD terrestrial wave digital broadcast carried and transmitted via cables, the terrestrial wave/cable receiver obtains the source ID(source_id) for the SD terrestrial wave digital broadcast from the cable VCT. Then, the combined terrestrial wave/cable receiver obtains a parameter for tuning to a terrestrial wave broadcast and the corresponding video packet PID information from the terrestrial VCT database by using the source ID(source_id).

When the parameter and corresponding video packet PID are obtained, the CPU 300 tunes to the terrestrial wave broadcast by using the terrestrial wave tuner of the terrestrial wave network interface unit 200, and sets a video PID to the TP demultiplexer 103 and stores incoming video packets in the main memory 400.

When the video packets starts to be stored in the main memory 400, the CPU 300 finds out packets containing a MPEG stream sequence header while analyzing the payload of the video packets.

Since the MPEG stream sequence header has an information(resolution, bit ratio, frame rate, etc.) with which it can be judged if a stream is a HD level, it is possible to judge if a terrestrial wave broadcast is a HD level by analyzing the information.

Figure 10:
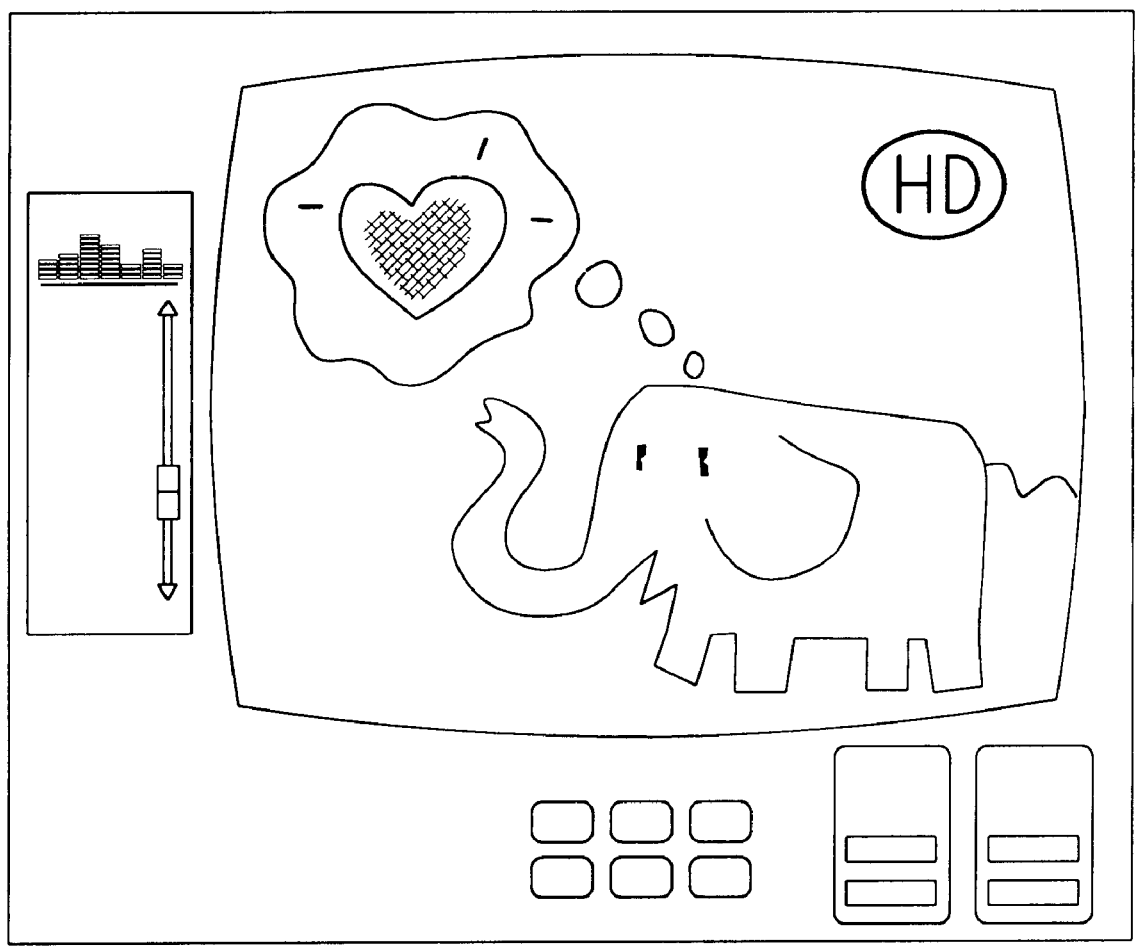
FIG. 10 is a view illustrating an indicator for indicating that a carried SD cable broadcast is a HD broadcast according to the present invention.

If the terrestrial wave broadcast is a HD broadcast, an indicator for indicating that the HD broadcast is down-converted into a SD level is displayed on a predetermined position of the screen of the carried SD level broadcast, as illustrated in FIG. 10.

Here, the indicator may be an icon indicated as 'HD'.

At this time, the CPU 300 switches the switching unit 500 to the terrestrial wave network interface unit 200 from the cable network interface unit 100 by pressing a 'HD' receivable hot key by using a remote control to which the hot key is previously set, thus making the viewer view a high definition broadcast program.

In addition, even in the case that the 'HD' icon displayed on a screen is designated by using a selection key of the remote control in place of the hot key, the viewer can view the high definition broadcast program by pressing the hot key.

Then, the CPU 300 sets the audio and video PID obtained from the service_location descriptor of the terrestrial wave PSIP during the switching of the switching unit 500 to the TP demultiplexer 103 for terrestrial waves, and A/V packets of a VSB-demodulated terrestrial wave broadcast are delivered to the decoders 600 and 700 through the switching unit 500.

Accordingly, the viewer can view a HD terrestrial wave broadcast when the A/V packets of the terrestrial wave broadcast are decoded to be outputted from the video decoder 600 and audio decoder 700.

At this time, when a cable broadcast is converted to a terrestrial wave broadcast, the CPU 300 stores the virtual channel number and source ID(source_id) of the terrestrial wave broadcast carried and transmitted via the cables in the SNT(Source Name Table). When the viewer presses a channel up/down key in the remote control while viewing a HD broadcast, the CPU 300 restores the virtual channel number stored in the SNT, performs channel-up/down based on the virtual channel number in the cable VCT, and then switches the switching unit 500 to the cable network interface unit 100 from the terrestrial wave network interface unit 200. Accordingly, the viewer does not sense the switching of the cable broadcast and terrestrial wave broadcast, but feel as if he or she viewed a HD broadcast.

As described above, when a SD level broadcast transmitted in the form of a cable broadcast is down-converted to a HD level, a predetermined icon is displayed on a television screen, and a HD level terrestrial wave broadcast is received automatically or by the user's selection, thereby making the viewer view a high definition terrestrial wave broadcast.

Meanwhile, it is also possible to receive the HD level broadcast by using broadcast program guide information carried and transmitted from the cable head end. This will be described as follows in more detail.

Figure 11:
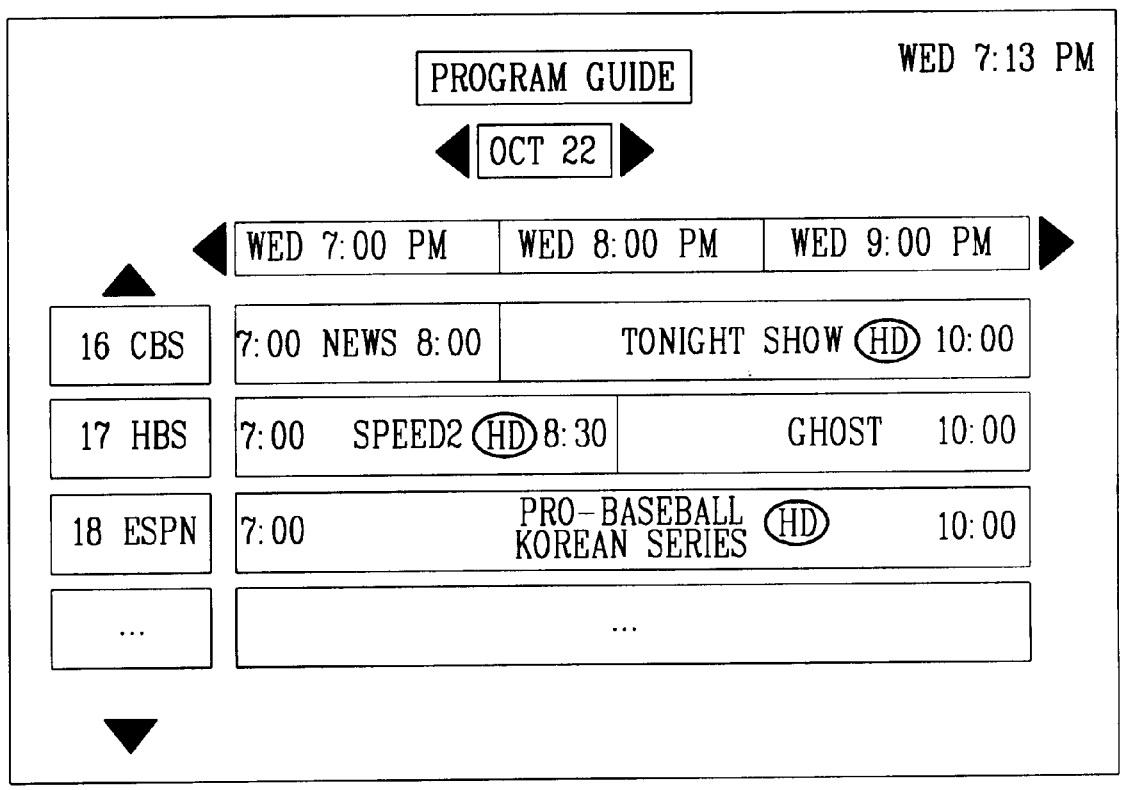
FIG. 11 is an EPG displayed on a screen according to the present invention.

FIG. 11 is an EPG that is displayed on a screen according to the EIT of FIG. 5, which is indicated as the HD level broadcast.

As described above, 'HD' can be indicated to predetermined programs by defining a HD descriptor in the EIT or PMT, and, according to this, when the viewer selects a HD level terrestrial broadcast, the combined terrestrial wave/cable broadcast receiver is operated to receive the HD level terrestrial wave broadcast in place of the SD level broadcast from the cable head end.

Figure 12:
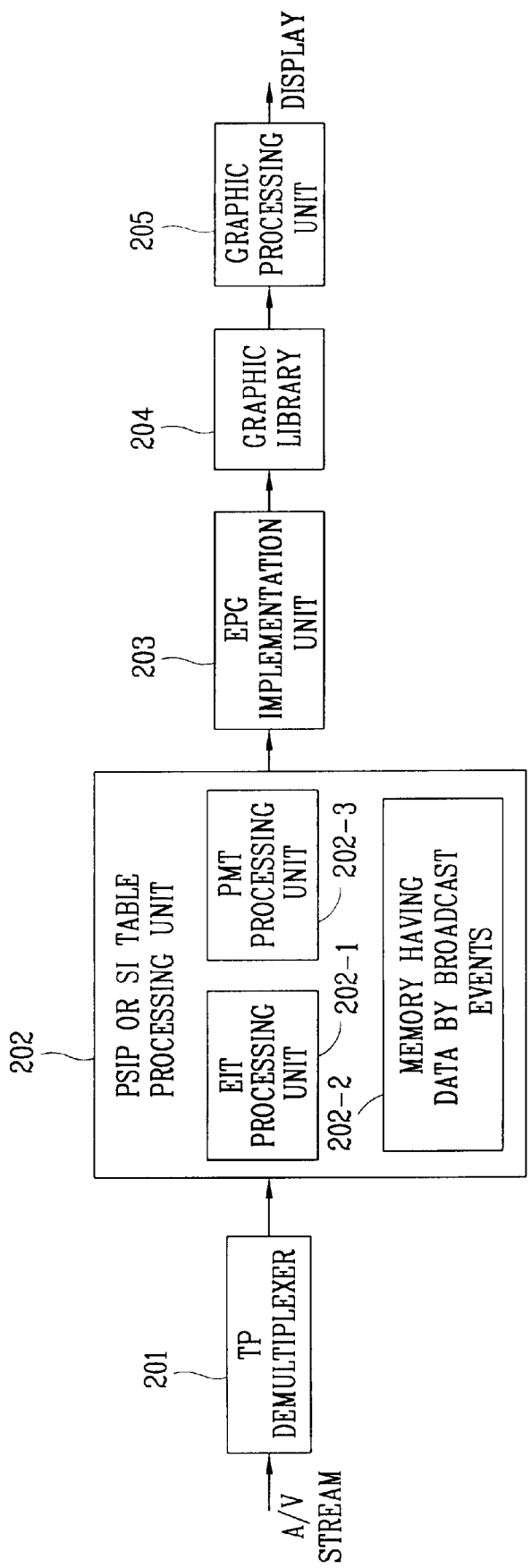
FIG. 12 is a block diagram illustrating a program information processing unit according to the present invention.

FIG. 12 is a block diagram of a program information processing apparatus of the combined terrestrial wave/cable broadcast receiver according to the present invention, which includes: a TP demultiplexer 201 for demultiplexing a MPEG A/V stream to output a PSIP or SI; an EIT processing unit 202-1 for analyzing an EIT contained in the PSIP or Si of the TP demultiplexer 201 or a PMT processing unit 202-3 for analyzing a PMT; a database 202-2 for storing data by each broadcast program processed by the EIT processing unit 202-1 or PMT processing unit 202-3; an EPG implementation unit 203 for implementing screen contents to be displayed upon receipt of broadcast program data stored in the database 202-2; a graphic library 204 for storing the screen contents implemented by the EPG implementation unit 203; and a graphic processing unit 205 for processing data stored in the graphic library 204 in order to display an EPG on a predetermined display.

The operation of the thusly configured program information processing apparatus of the combined terrestrial wave/cable broadcast receiver according to the present invention will now be described with reference to FIG. 13.

Figure 13:
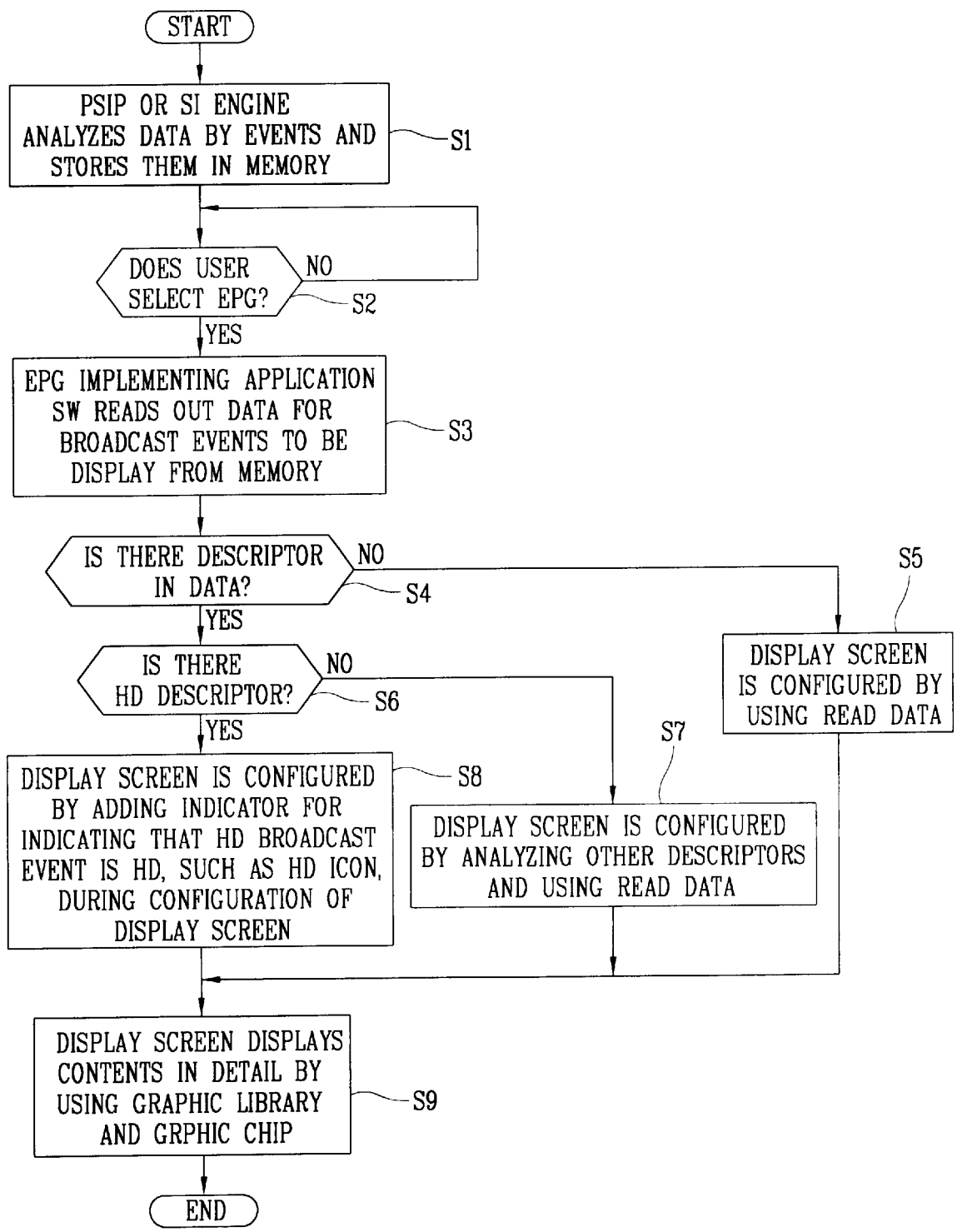
FIG. 13 is a flow chart illustrating a program information processing method for the combined terrestrial wave/cable broadcast receiver.

FIG. 13 is a flow chart illustrating a program information processing method of the combined terrestrial wave/cable broadcast receiver according to the present invention. Herein, when the TP demultiplexer 201 demultiplexes an MPEG A/V stream outputted from the tuner and the demodulator to thus output the same, the PSIP table or SI table processing unit 202 analyzes the demultiplexed data. In other words, the EIT processing unit 202-1 or PMT processing unit 202-3 of the demultiplexing processing unit stores data by each broadcast program in the memory 202-2 in a previously set data structure by analyzing the EIT or PMT contained in the PSIP table or SI table included in the demulitplexed data in S1.

At this time, if the user wants an EPG screen in S2, the EPG implementation unit 203 reads out information on each broadcast program stored in the memory 202-2.

To inform the viewer of information on broadcast programs, as illustrated in FIG. 5, it is judged if there is a descriptor in the information on broadcast programs in S4. If there is no descriptor, screen contents to be displayed is configured by using information on programs having no descriptor in S5, or if there is a descriptor, the EPG implementation unit 203 judges if there is a HD descriptor by using a HD descriptor tag in S6.

If there is no HD descriptor, a screen on which read data is to be displayed is configured by analyzing other descriptors in S7, or if there is a HD descriptor, a display screen is configured by adding an indicator for indicating that a broadcast program is a HD program, as illustrated in FIG. 10, or a HD broadcast program guide is displayed by sorting HD broadcast programs in S8. Thus, the viewer sets the HD broadcast programs so as to reserve-viewing them, or implements other additional functions such as reserve-recording.

The thusly configured display screen displays contents in detail by using the graphic library 204 and graphic processing unit 205 in S9.

Accordingly, if the broadcast program that the combined terrestrial wave/cable broadcast receiver according to the present invention has received from the cable head end is a HD level broadcast down-converted to the SD level, it indicates a currently broadcast program as the HD level broadcast. Then, if the viewer selects this broadcast program, the combined terrestrial wave/cable broadcast receiver receives a HD level terrestrial wave broadcast corresponding to the currently broadcast program to thus show the same to the viewer.

As described above, if the combined terrestrial wave/cable broadcast receiver according to the present invention receives the HD terrestrial wave broadcast down-converted to the SD level from the cable head end via cables, it indicates the broadcast being received or to be received as the HD broadcast, and receives a terrestrial wave HD broadcast transmitted from the terrestrial wave broadcasting station and corresponding to the program received from the cables automatically or according to the user's selection, thus making the viewer view a program having the same quality as the broadcast made by a broadcasting producer.

In the program information processing method according to the present invention, HD broadcast-related information is processed to be contained in an EPG source for indicating if a cable broadcast carried and transmitted by the cable head end is a HD broadcast, or indicating if a cable broadcast program to be transmitted is a HD broadcast, on a screen of the set top box of the viewer. Thus the combined terrestrial wave/cable broadcast receiver shows the HD broadcast to the viewer automatically or according to the user's selection.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A program information processing apparatus, comprising:

a cable broadcast receiving unit for receiving a cable broadcast signal transmitted from a cable head end via cables;

a terrestrial wave broadcast receiving unit for receiving a terrestrial wave broadcast signal;

an output unit for outputting the broadcast signals received by the cable broadcast receiving unit and terrestrial wave broadcast receiving unit to the outside so that a viewer can view a broadcast program;

a control unit for judging if a cable broadcast signal being received or to be received by the cable broadcast receiving unit is a HD broadcast signal, and, if so, automatically indicating that it is a HD broadcast signal in the output unit; and a switching unit in which, if the cable broadcast signal is a HD broadcast signal, the terrestrial wave broadcast receiving unit directly receives a HD terrestrial wave broadcast signal to output the same to the output unit according to the control of the control unit receiving a command signal of a viewer.

2. The apparatus according to claim 1, wherein the cable broadcast signal is produced as a HD level or SD level by a cable operator, or is produced by down-converting a HD level broadcast from a terrestrial wave broadcasting station to a SD level.

3. The apparatus according to claim 1, wherein the cable broadcast receiving unit comprises:

a cable tuner for tuning the cable broadcast signal to a predetermined channel;

a demodulator for demodulating the cable broadcast signal tuned by the cable tuner;

a demultiplexer for demultiplexing an A/V stream outputted from the demodulator into a demodulated video signal and a demodulated audio signal;

an OOB tranceiving unit for receiving or transmitting cable broadcast guide information from/to the cable tuner; and an OOB processing unit for converting the protocol of data processed by the OOB transceiving unit.

4. The apparatus according to claim 1, wherein the terrestrial wave broadcast receiving unit comprises:
   a terrestrial wave tuner for tuning the terrestrial wave broadcast signal to a predetermined channel;
   a demodulator for demodulating the terrestrial wave broadcast signal tuned by the terrestrial wave tuner; and
   a demultiplexer for demultiplexing an A/V stream outputted from the demodulator into a demodulated video signal and a demodulated audio signal.

5. The apparatus according to claim 1, wherein the control unit further comprises a memory for storing program-related information contained in the cable broadcast signal.

6. The apparatus according to claim 1, wherein the control unit controls the terrestrial wave broadcast receiving unit so as to receive a terrestrial wave broadcast signal corresponding to the broadcast signal currently received by the cable broadcast receiving unit by using the source ID of the currently received cable broadcast, and judges the existence or non-existence of a HD broadcast by extracting the video PID of the corresponding broadcast and analyzing the sequence header of the video packet by using the broadcast program and system information protocol of a tuned channel.

7. The apparatus according to claim 1, wherein the control unit controls the terrestrial wave broadcast receiving unit so as to automatically receive a HD level broadcast from a terrestrial wave broadcasting station.

8. The apparatus according to claim 1, wherein the control unit controls the switching unit in such an manner that, if the viewer inputs a command signal in order to receive a HD broadcast while viewing a cable broadcast, the switching unit memorizes channel information of the cable broadcast and then receives a HD terrestrial wave broadcast to output the same to the output unit, and if the viewer inputs a command signal to receive a cable broadcast again, the switching unit searches the memorized cable broadcast channel information and then receives a cable broadcast to output the same to the output unit.

9. The apparatus according to claim 1, wherein the viewer's command signal is generated by operating a hot key for receiving a HD terrestrial broadcast of a remote control, operating a control device attached to a predetermined position of the combined receiver, or operating a keyboard or mouse connected to the combined receiver by wired or wirelessly.

10. The apparatus according to claim 1, wherein the output unit comprises:
    a video decoder for decoding the broadcast signal outputted from the switching unit to a video signal;
    a display unit for outputting an image upon receipt of the video signal;
    an audio decoder for decoding the broadcast signal outputted from the switching unit to an audio signal; and
    a speaker for outputting sound upon receipt of the audio signal.

11. The apparatus according to claim 1, wherein an indicator for indicating that a cable broadcast program is a HD program in the output unit is an icon.

* * * * *